United States Patent [19]

Miller

[11] 3,726,373
[45] Apr. 10, 1973

[54] OVERRUNNING CLUTCH WITH MULTIPLE MAGNET RETARDATION

[75] Inventor: Donald L. Miller, Horseheads, N.Y.

[73] Assignee: The Bendix Corporation, Southfield, Mich.

[22] Filed: Dec. 8, 1970

[21] Appl. No.: 96,203

[52] U.S. Cl. ............... 192/84 PM, 192/35, 192/53 D
[51] Int. Cl. ............................................. F16d 27/00
[58] Field of Search ....................... 192/84 PM, 46 R, 192/35 R, 53 D

[56] References Cited

UNITED STATES PATENTS

| | | | |
|---|---|---|---|
| 2,437,871 | 3/1948 | Wood | 192/84 PM |
| 2,929,477 | 3/1960 | Rodriguez et al. | 192/84 PM |
| 3,240,304 | 3/1966 | Wickersham | 192/84 PM |
| 2,876,878 | 3/1959 | Sinclair et al. | 192/84 PM |
| 3,283,588 | 11/1966 | Merchant | 192/84 PM |
| 3,306,406 | 2/1967 | Poliseo | 192/46 |

Primary Examiner—Charles J. Myhre
Assistant Examiner—Randall Heald
Attorney—Robert A. Benziger and Plante, Hartz, Smith and Thompson

[57] ABSTRACT

A positive drive jaw or tooth clutch of the overrunning type which automatically engages and/or disengages by axial movement of a movable clutch member connected through a helical spline or equivalent connection, such as a pin and slot connection, to a driving member is disclosed herein. The clutch is particularly characterized by the addition of multiple permanent magnet drive means to provide a retarding force which induces axial travel between the helically-connected members to obtain clutch engagement but wherein the magnet drive means are of the synchronous follower drive type which permits high speed overrun without overheating.

8 Claims, 4 Drawing Figures

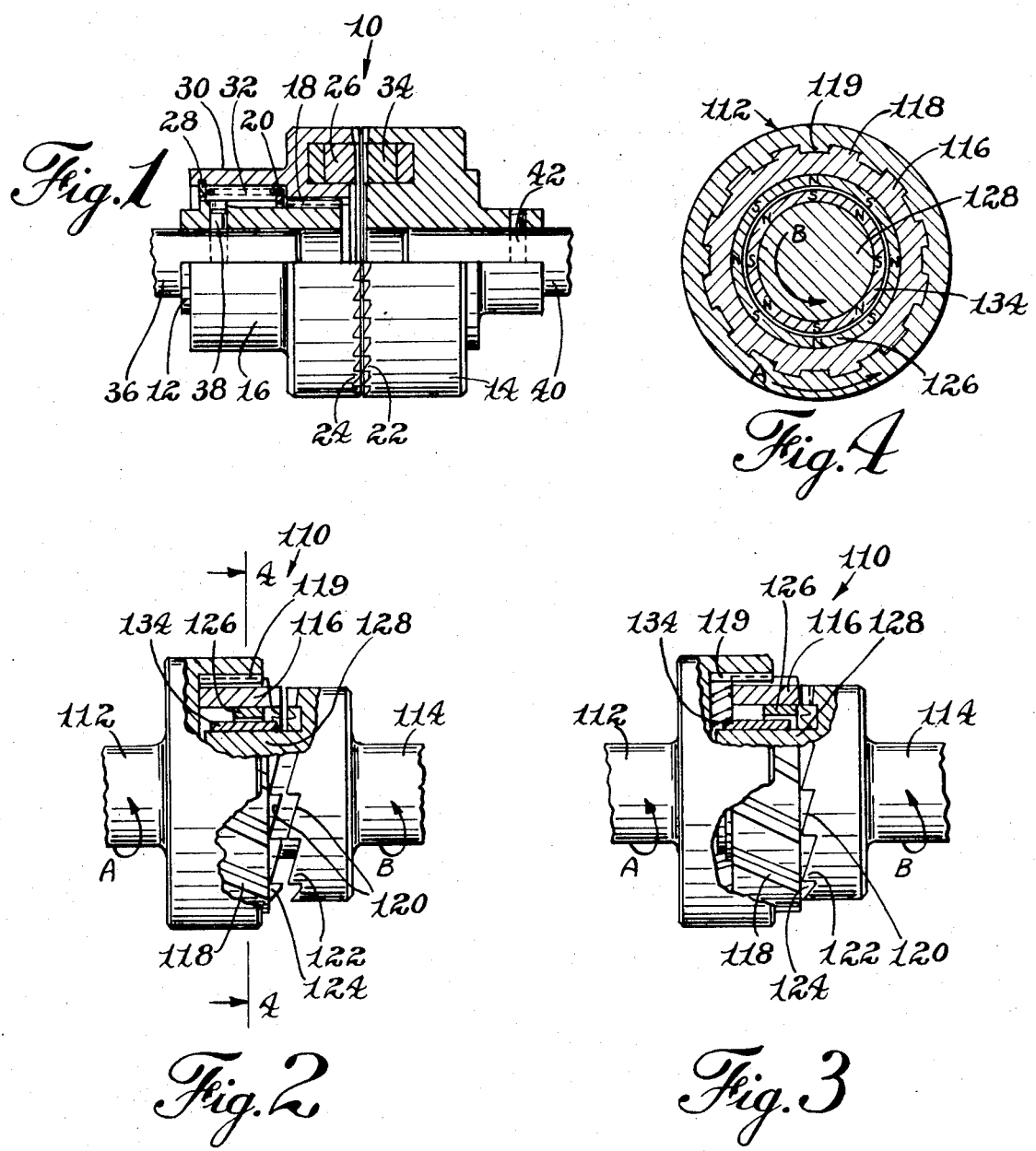

OVERRUNNING CLUTCH WITH MULTIPLE MAGNET RETARDATION

BACKGROUND OF THE INVENTION

1. Field of the Invention

The present invention relates generally to the field of clutches. In particular, the present invention relates to the field of overrunning clutches. Specifically, the present invention relates to that portion of the field of overrunning clutches in which the clutch is comprised essentially of an input member and an output member and in which one of the input and output members is connected to a middle clutch means capable of executing motion into and out of engagement with the other one of the two input and output members.

2. Description of the Prior Art

Positive drive clutches which automatically self-engage and/or disengage dependent on relative rotation between a driving and driven member and which have overrunning capability are well known. The most common but not exclusive application of these well known clutches is one form of the well known engine starter drive. Self-engagement in the referred to context simply means that an axially movable clutch member advances either into or out of engagement with a mating member without externally imposed shifting means. Rather, the forces available within the clutch derived from acceleration or from rotational energy are used to self-generate the engagement/disengagement shifting forces. A characteristic of such clutches is that one of the clutch members is connected through a helical connection to one of the driving and driven members, usually to the driving member. The helical connection can develop a reaction force having an axial force component that can be controlled to selectively shift the movable clutch member in the desired direction. One means used to generate the mentioned axial force component is by using a frictional retarder which applies a rotational drag to the movable clutch member insufficient to impede rotation but sufficient to generate the axial shifting reaction force at the helix. It is further desired in a clutch of the type to which this invention relates to provide an overrunning means or capability so that the driven load may overrun, at certain times, the driving member. For passive loads, this usually occurs shortly after terminating the driving energy, i.e., shutdown, and for active self-propelling loads like the automotive engine this occurs on engine start-up.

A major difficulty with the prior practice of employing a frictional retarder is that the overrun situation does not terminate the frictional interconnection and the presence of the frictional interconnection generates great amounts of heat and wear which seriously shorten the useful life of the overrunning clutch. It is, therefore, an object of the present invention to provide an overrunning clutch of the type herein described which employ means other than a frictional retarder to generate the desired axial shifting force components.

It is also well known in the art to employ magnetic means to selectively generate the shifting force components. However, the prior art magnetic means have been subject to the generation of great amounts of heat upon overrun due to the fact that these prior art magnetic means have employed rotating magnetic fields within one of the two relatively rotating clutch members to generate the desired axial shifting force component and these magnetic fields, upon high speed overrun, tend to produce heating equivalent to the frictional retarder heating. It is, therefore, a specific object of the present invention to provide a clutch of the above described type which employs magnet means to generate the desired axial shifting force components but which does not rely upon rotating magnetic fields to generate the necessary shifting forces. More specifically, it is an object of the present invention to provide permanent magnet means on each of the inter-engageable clutch elements to effect the generation of the necessary shifting forces. Further, it is an object of the present invention to provide such magnet means in alternating polar confronting relationship such that rotating magnetic fields are not induced in the relatively rotatable elements.

SUMMARY OF THE PRESENT INVENTION

The present invention contemplates an overrunning clutch having a driving member and a driven member both of which are adapted for rotational movement. An axially movable middle clutch means is coupled to one of the rotational elements through a helical connection for axial movement relative thereto. The other of the rotational elements and the middle clutch means are each provided with torque transmitting teeth, preferably jaw teeth, for inter-engagement therebetween to provide a torque transmitting path. The present invention is characterized by the provision of permanent magnet means mounted on each of the middle clutch means and its inter-engageable rotational element to provide in combination with the helical interconnection, an axial force component on the middle clutch means which will tend to move the middle clutch means axially in a direction dependent upon the direction and velocity of relative rotation between the middle clutch means and its inter-engageable rotational element. The invention is further characterized in two forms by providing the permanent magnet means in a radially-spaced relationship in one embodiment and in an axially-spaced relationship in a second embodiment. In the second embodiment of the present invention, the axially-spaced relationship provides a further force component tending to assist in causing inter-engagement of the middle clutch means and its inter-engageable rotational element at near-synchronous rotation.

DESCRIPTION OF THE DRAWINGS

FIG. 1 shows the currently preferred embodiment of the present invention in an elevational partial sectional view. In the FIG. 1 embodiment, the permanent magnet means are in an axially-spaced relationship.

FIG. 2 shows an alternative form of the present invention in an elevational, partly-sectional, partly-broken away view in which the permanent magnet means are in a radially-spaced relationship. In the FIG. 2 embodiment, the clutch is illustrated in the disengaged mode.

FIG. 3 shows the clutch of the FIG. 2 embodiment in the engaged mode.

FIG. 4 shows a sectional view of the permanent magnet means of the FIG. 2 embodiment.

DETAILED DESCRIPTION OF THE DRAWINGS

Referring now to FIG. 1, a clutch according to the present invention is illustrated in a disengaged configuration. In this embodiment, the clutch 10 is comprised of a first rotational element or member 12, a second rotational element or member 14, a middle clutch means 16. The middle clutch means 16 in this embodiment is connected to the outer periphery or circumference of first rotational member 12 by a spline connection 18.

In the FIG. 1 embodiment, the middle clutch means 16 is illustrated as being in abutment with stop ring 20 of rotational element 12. Stop ring 20 is operative to limit the axial movement of middle clutch 16 away from second rotational element 14. Rotational element 14 and middle clutch means 16 are each provided with complementary jaw teeth 22, 24 which, in this embodiment extend axially toward one another. First permanent magnet means 26 are fixedly retained within middle clutch means 16. A retainer ring means 28 is included within the axially extending portion 30 of middle clutch means 16 and a resilient biasing means in the form of a coil spring 32 is compressively confined between retainer ring 28 and stop ring 20 to provide an axially leftward (relative to FIG. 1) bias on the middle clutch means 16.

The second rotational element 14 includes second permanent magnet means 34 arranged to be substantially-radially co-extensive with said first magnet means 26 but axially-spaced therefrom. The first and second permanent magnet means are retained by suitable means such as gluing or cementing and are adapted to provide equal numbers of magnet poles equidistantly spaced about the permanent magnet means 26, 34. This may be achieved by placing a plurality of discrete magnets within each of the middle clutch means 16 and second rotational element 14 or as a currently preferred alternative, first and second magnet means may comprise a suitably prepared magneto-ceramic material providing a plurality of magnet poles, in any convenient shape or configuration such as annular rings. Indiana General Corporation Indox 5 Ceramic MultiPole Permanent Magnets are one form of a suitable magneto-ceramic material.

First rotational element 12 is coupled to a shaft 36 by any suitable means, shown here as a conventional pin 38 passing through first rotational element 12 and shaft 36. Second rotational element 14 is similarly coupled to shaft 40 by suitable means also illustrated as a pin connection 42.

Referring now to FIGS. 2 and 3, my invention is illustrated in an embodiment which incorporates radially-spaced first and second magnet means. The clutch 110 of this embodiment is comprised of first rotational element or member 112, second rotational element or member 114 and middle clutch means 116. In this embodiment, middle clutch means 116 is coupled to first rotational element 112 by means of helical splines 118 on middle clutch means 116. Splines 118 mate with cooperating splines, shown as 119, on first rotational element 112. Middle clutch means 116 further includes jaw teeth 124 which are adapted to cooperate with complementary jaw teeth 122 on the second rotational element 114. As illustrated in this embodiment, jaw teeth 122 and 124 extend axially toward one another and further include complementary ramp surfaces shown here as 120. Middle clutch means 116 is herein provided with first magnet means 126.

In the arrangement of the structure described hereinabove, middle clutch means 116 is an essentially annular element with splines 118 formed on the radially outward periphery thereof and first permanent magnet means 126 attached to the radially inner periphery thereof by suitable means such as cementing. Jaw teeth 124 are formed on one end portion of middle clutch member 116. First rotational element 112 has an annular, axially-extending portion with helical splines 119 formed on the radially inner periphery thereof and middle clutch member 116 is received therein.

Second torque transmitting element 114 is provided with an axially extending stub shaft portion 128 which extends axially beyond jaw teeth 122. Second permanent magnet means 134 are fixedly attached to stub shaft portion 128.

Referring now to FIG. 4, a section view taken along the lines 4—4 in FIG. 2 is illustrated. In this figure, the relationship of the first rotational element 112 to the middle clutch means 116, and of first magnetic means 126 to second permanent magnet means 134 is illustrated. First permanent magnet means 126 is illustrated as having a plurality of magnetic poles spaced equidistantly about the magnet means which is illustrated here as a solid annular ring. This may be for instance, a ring of ceramic material with magnetic particles embedded therein so as to provide the desired polar placement. Second permanent magnet means 134 is also illustrated as an annular ring having the same number of magnetic poles as first permanent magnet means 126 and spaced equidistantly about the second permanent magnet means 134. Alternatively, first and second permanent magnet means could comprise a plurality of discrete permanent magnets. As illustrated here, it is considered essential for the best operation of this invention that the magnetic poles alternate about the first and second magnetic means and this necessary alternation requires that there be an even number of magnetic poles.

OPERATION

The operation of my invention will be described with reference to FIGS. 2, 3 and 4. It will be apparent to the man of ordinary skill in the art that the following description, when suitably altered to compensate for the axial as opposed to radial magnetic placement, will be equally applicable to the FIG. 1 embodiment.

Wherever there exists a slight differential relative rotation between the first and second rotational elements, the magnetic poles of one permanent magnet means will appear to be rotating slowly past the magnet poles of other of the permanent magnet means. As a first condition, assume rotation of rotational element 112 is in the direction denoted by arrow A and rotational element 114 is rotating in the direction denoted by arrow B but more slowly than rotational member 112. Taking rotational member 114 as the frame of reference, rotational element 112 will be rotating past rotational element 114 in the direction of arrow A at the differential speed (A–B). Magnetic poles (N & S) of the permanent magnet means 126 will alternately approach, and move away from matching and opposite magnetic poles on permanent magnet means 134. As magnetic poles of magnet means 126 move away from magnetic poles of the opposite sense of magnet ring 134 and toward matching magnetic poles of magnet means 134 the natural attractive force between opposite magnetic poles and the natural repulsion between matching magnetic poles will cause a rotational retarding force to be applied to middle clutch means 116 which will, as a result thereof, tend to advance on helical connection 118, 119, toward second rotational element 114. If the dwell time, determined as a function of the number of magnetic poles and the differential speed of rotation (A–B), is sufficiently great middle clutch means 116 will advance sufficiently so that jaw teeth 124 will interengage jaw teeth 122 and the additional load of second rotational element 114 will complete the engagement. However, if the speed (A–B) is large, middle clutch means 116 will remain spaced apart from rotational element 114. This condition is, of course, not desired.

Assuming the same senses of rotation and that second rotational element 114 is experiencing angular acceleration, the differential speed (again using rotational element 114 as the frame of reference) will become (B–A). In this relationship, the ramp surfaces will cam apart and middle clutch means 116 will be forced away from second rotational element 114. As second rotational element 114 continues to accelerate, the dwell time will be such that a net axial force away from second rotational element 114 will exist during the period of acceleration and middle clutch means 116 will tend to move away from second rotational element 114. Additional anti-drift springs (such as is illustrated as 32 in FIG. 1) may add a slight anti-engagement bias. At substantially constant over-run speeds, middle clutch means 116 will tend to "flutter" relative to first rotational element 112 due to the effect of the rotating magnet poles but this will be an essentially balanced motion.

It will thus be seen that the present invention achieves its stated objectives. A retarder mechanism for facilitating engagement of a middle clutch means in an over-running clutch is provided. The over-running clutch, according to the present invention, is capable of completely terminating the mechanical interconnection of driving member and driven member in a fashion which transmits zero torque and which does not cause heating of the clutch parts. By providing permanent magnet means on each of the middle clutch means and second rotational member in an alternating polar confronting relationship, the magnetic flux associated therewith is provided with closed loop paths essentially independent of the non-magnet portions of the over-running clutch. Thus, the rotating magnetic fields which were a prior cause of extraneous heating in those known clutches which employed but a single magnetic means are avoided. By alternating polar confronting relationship is meant the relationship between first and second permanent magnet means which provides that, in a selected rotary position, magnet poles of one sense on the first magnet means will be in a closely-spaced relationship to magnet poles of the other sense on the second magnetic means such that the force of attraction therebetween will be maximized.

I claim:

1. A torque transmitting coupling device comprising: first and second rotational elements arranged in axial alignment;

middle clutch means coupled to said first rotational element and adapted to engage said second rotational element in a torque transmitting relationship;

first and second magnet means attached to said middle clutch means and said second relationship element, respectively;

said first and second magnet means arranged in alternating polar confronting relationship whereby, upon relative rotation of said second rotational element with respect to said first rotational element, said first magnet means and said middle clutch means will alternately attempt to follow, and be repelled from following, the rotary motion of said second rotational element; and helical coupling means interconnecting said middle clutch means and said first rotational element, so that in response to the periods of attempted motion said middle clutch means moves toward said second rotational element.

2. The coupling device as claimed in claim 1 including further resilient means operative to yieldingly bias said middle clutch means away from said second rotational elements.

3. The coupling device as claimed in claim 1 wherein said first and second magnet means are axially spaced apart.

4. The coupling device as claimed in claim 1 wherein said first and second magnet means are spaced apart in a direction substantially perpendicular to the axial direction.

5. The coupling device as claimed in claim 1 wherein said middle clutch means and said second rotational member are adapted to transmit torque through unidirectional jaw teeth.

6. The coupling device as claimed in claim 5 wherein said second rotational member further includes a stub shaft portion protruding axially beyond said jaw teeth, said second magnet means being attached thereto, and said middle clutch means are radially spaced from, but axially-overlap, said stub shaft portion.

7. The coupling device as claimed in claim 1 wherein said first and second magnet means comprise means for providing a plurality of permanent magnet poles.

8. A torque transmitting coupling comprising:

first rotary means;

second rotary means in axial alignment with the first rotary means;

middle clutch means operatively connected to the first rotary means for relative rotation therewith, said middle clutch means adapted to engage the second rotary means in a torque transmitting relationship;

first magnet means attached to and fixed for rotation with the middle clutch means; and second magnet means attached to and fixed for rotation with second rotation means, said second magnet means arranged in confronting magnetic circuit relationship with the first magnet means, so that at a predetermined differential speed of rotation between the first and second rotary means, the first and second magnet means will magnetically interact thereby rotationally retarding the middle clutch means, causing the middle clutch means to rotate relative to the first rotary means moving the middle clutch means into engagement with the second rotary means.

* * * * *